United States Patent [19]

Hata

[11] 4,077,676
[45] Mar. 7, 1978

[54] VEHICLE LOAD RESPONSIVE BRAKE PRESSURE CONTROL DEVICE

[75] Inventor: Yasuhisa Hata, Kobe, Japan

[73] Assignee: The Nippon Air Brake Co., Ltd., Kobe, Japan

[21] Appl. No.: 780,797

[22] Filed: Mar. 24, 1977

[30] Foreign Application Priority Data

Apr. 8, 1976 Japan .................................. 51/39901

[51] Int. Cl.[2] .............................................. B60T 8/22
[52] U.S. Cl. .................................................. 303/22 A
[58] Field of Search ........... 188/195; 303/22 A, 22 R, 303/23 R, 23 A, 40

[56] References Cited

U.S. PATENT DOCUMENTS

| | | | |
|---|---|---|---|
| 3,155,435 | 11/1964 | Hicolay et al. | 303/40 |
| 3,517,971 | 6/1970 | Scott | 303/22 A |
| 3,597,013 | 8/1971 | Shah | 303/22 A |

FOREIGN PATENT DOCUMENTS

| | | | |
|---|---|---|---|
| 488,600 | 12/1953 | Italy | 303/22 R |
| 332,697 | 10/1958 | Switzerland | 303/40 |

*Primary Examiner*—George E. A. Halvosa
*Attorney, Agent, or Firm*—R. S. Visk; R. W. McIntire, Jr.

[57] ABSTRACT

A brake pressure control device for use on vehicles equipped with air springs for proportioning the braking pressure delivered to the brake cylinders at a preselected ratio relative to the vehicle load as reflected by the prevailing air spring pressure, and including adjustable spring and lever mechanism for varying the proportioning ratio of the control device in accordance with the respective varying weights and load capacities of various vehicles, so that the control device may be used on a wide range of vehicles and adjusted to provide the desired pressure ratio.

8 Claims, 4 Drawing Figures

VEHICLE LOAD RESPONSIVE BRAKE PRESSURE CONTROL DEVICE

BACKGROUND OF THE INVENTION

There presently exist brake pressure control devices which are operably interposed between vehicle air springs and a brake pressure supply valve so as to be responsive to the pressure of fluid prevailing in the air springs, which reflects the degree of vehicle load, for controlling the pressure of braking fluid supplied to the brake cylinders in accordance with the prevailing vehicle load and thereby effect ideal braking force for the given vehicle load. The usual construction of presently known brake pressure control devices includes first diaphragm means arranged in oppositely facing relation to second diaphragm means with a precalibrated spring compressed therebetween and acting on the respective facing sides of the two diaphragm means. The respective sides of the two diaphragm means are subjected, respectively, to prevailing air spring pressure and to pressure delivered to the braking apparatus, so that the force differential between the air spring pressure and the precalibrated spring across the first diaphragm means causes the second diaphragm means to effect operation of a self-lapping valve member to effect delivery and maintain pressure to the braking apparatus at a ratio determined by prevailing air spring pressure and the calibrated spring.

In such a conventional device, as immediately above described, the effective area ratio between the first and second diaphragm means, and the calibration of the spring disposed therebetween, are both fixed and cannot be adjusted. Thus, when used on different vehicles characterized by different speed retardation requirements, different air springs, and different vehicle loads, etc., the control devices must be replaced by other devices having diaphragms and springs that will meet the requirements for the particular vehicles, if it is desired to obtain ideal braking action. This would necessitate having many different brake pressure control devices which would be costly for manufacturing them.

SUMMARY OF THE INVENTION

The object of the present invention, therefore, is to provide a vehicle load responsive brake pressure control device including adjusting means for adapting the control device to different vehicles having different braking requirements, different air springs, and different load capacities.

Briefly, the brake pressure control device embodying the invention includes the usual arrangement of diaphragms on which air spring pressure and delivered brake pressure act in opposing relation. But instead of having the usual single precalibrated spring interposed between the diaphragm, the brake pressure control device embodying the invention has, interposed between the diaphragms, a pair of opposingly disposed springs acting on respective ends of opposingly arrange fulcrum levers through which the respective diaphragm forces are transmitted to a supply-exhaust valve member for effecting operation thereof for controlling fluid pressure supplied to the brake actuating devices. According to the invention, each spring is independently compressedly adjustable as are the moment arms of the fulcrum levers, thereby making brake pressure control devices adaptable to different cars having different retardation requirements, different air springs, and different load capacities.

DESCRIPTION AND OPERATION — FIG. 1

Figure 1:
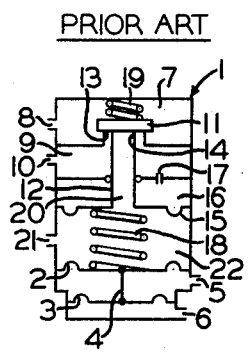
FIG. 1 is a diagrammatic elevational view of a conventional load responsive brake pressure control device.

A conventional load responsive brake pressure control device 1 shown diagrammatically in FIG. 1 comprises a pair of diaphragms 2 and 3 connected in tandem relation to each other by a stem 4 for unitary movement. Diaphragms 2 and 3, which are of different effective pressure areas, are subjected on corresponding sides to prevailing respective fluid pressures of a pair of vehicle air springs (not shown) via respective inlet ports 5 and 6 connected to the air springs, the smaller of said diaphragms being subjected on both sides to both air spring pressures.

Brake pressure control device 1 further includes a supply chamber 7, connected to a source of fluid under pressure via a supply port 8, and a delivery chamber 9 having a delivery port 10 via which control pressure is delivered to brake operating apparatus (not shown). A supply valve 11 and an exhaust valve 12 are arranged in conventional manner with respective supply and exhaust valve seats 13 and 14 for effecting or cutting off communication between supply chamber 7 and delivery chamber 9.

A force-balancing diaphragm 15 in the control device 1 is axially aligned with and spaced apart from diaphragms 2 and 3, and is subjected on one side to fluid pressure in an equalizing chamber 16 communicating with delivery chamber 9 via a choke 17. A spring 18 of predetermined compression rating is axially disposed between diaphragms 2 and 15.

A relatively light spring 19 urges supply valve 11 toward a seated or closed position on supply valve seat 13, whereas spring 18 acting through diaphragm 15, which is axially connected to exhaust valve 12, urges said exhaust valve toward a seated or closed position on exhaust valve seat 14 disposed on the underside of said supply valve. When all fluid pressure forces and all spring forces acting on diaphragms 2, 3, and 15 are in a state of equilibrium, both supply valve 11 and exhaust valve 12 are in a lapped position in which both valves are seated on the respective seats 13 and 14, thus cutting off communication between supply chamber 7 and delivery chamber 9 and between delivery chamber 9 and atmosphere via a passageway 20 formed in said exhaust valve and an atmospheric vent port 21 opening from an atmospheric chamber 22 in which spring 18 is disposed.

Air spring pressure acting on diaphragms 2 and 3 is converted by said diaphragms to an average pressure which produces a resultant force acting in opposition to the force of spring 18. Calibration of spring 18 is preselected such as to provide a spring force greater than the resultant force produced by air spring pressure relfecting an empty vehicle, so that the differential force between the spring force and the resultant force causes upward movement of exhaust valve 12, which is seated on supply valve 11, and consequent unseating of said supply valve to cause fluid pressure to be supplied, via delivery chamber 9 and delivery port 10, to the braking apparatus (not shown). Due to the calibration of spring 18, as above noted, and the force produced thereby, brake pressure control device 1 always provides for a minimum braking effort commensurate, at least, with an empty vehicle. Pressure in delivery chamber 9, flowing through choke 17, eventually builds up in chamber 16 sufficiently to equalize the forces acting across diaphragm 15 and cause said diaphragm and exhaust valve 12 to move downwardly until supply valve 11 reseats on valve seat 13. Supply valve 11 and exhaust valve 12 thus assume a lapped condition until a change occurs in the state of air spring pressure acting on diaphragms 2 and 3.

If the load on the vehicle is increased, air spring pressure increases accordingly, and, therefore, supply valve 11, due to upward movement of diaphragm 15, is again unseated to permit an increase in the pressure delivered to the brake apparatus until a state of equilibrium is again attained, at which time a lapped condition will again prevail. Thus, as is well known to those skilled in the art, brake pressure control device 1 operates in conventional manner for adjusting and maintaining braking pressure at a level commensurate with vehicle load.

As was above discussed, however, the structural characteristics of the type of brake pressure control device 1, as shown in FIG. 1, cannot be adjusted to meet specifications of various vehicles having different speed retardation requirements, different air springs, and different vehicle load capacities.

Figure 3:
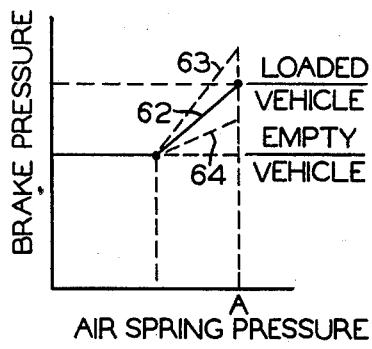
FIG. 3 is a graphic representation of the function of both the control devices shown in FIGS. 1 and 2.

The relationship of air spring pressure to brake pressure (as supplied via delivery port 10) is graphically illustrated by the graph shown in FIG. 3, which is believed to be self-explanatory.

DESCRIPTION & OPERATION — FIGS. 2 & 4

Figure 2:
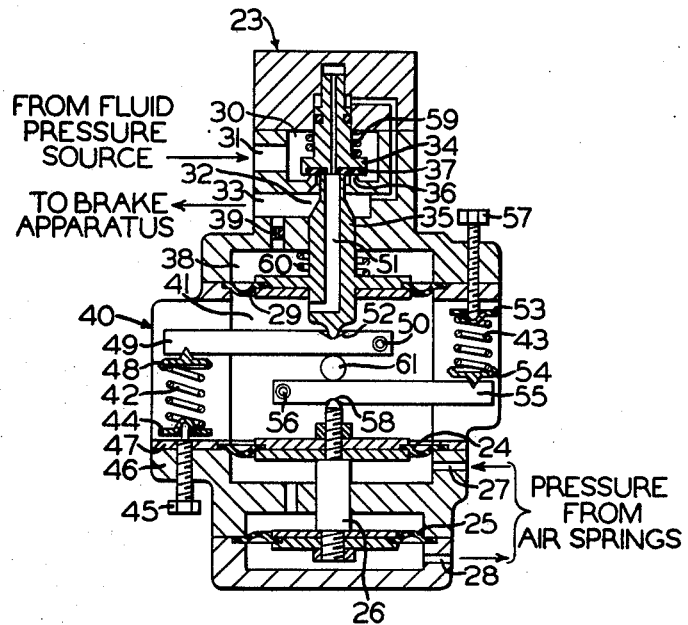
FIG. 2 is an elevational view, in section, of a load responsive brake pressure control device. embodying the invention.

A preferred embodiment of the invention is a load responsive brake pressure control device 23, as shown in FIG. 2.

Brake pressure control device 23, similarly to control device 1, is provided with a pair of diaphragms 24 and 25 connected by a stem 26 and subjected to air spring pressure via inlet ports 27 and 28 in a manner similar to diaphragms 2 and 3 of control device 1. Also similarly to control device 1, control device 23 includes a force-balancing diaphragm 29 (axially aligned with and spaced apart from diaphragms 24 and 25), a supply chamber 30 connected via a supply port 31 to a source of fluid pressure (not shown), a delivery chamber 32 having a delivery port 33, a supply valve 34, an axially elongated exhaust valve 35 with respective valve seats 36 and 37, said exhaust valve being concentrically secured to diaphragm 29, and an equalizing chamber 38 communicating with said delivery chamber via a choke 39.

Control device 23 differs from control device 1 in that spring 18 in the latter device is replaced by a spring and lever assembly 40 operably disposed in an atmospheric chamber 41 between diaphragms 24 and 29.

Spring and lever assembly 40 comprises a pair of compressibly adjustable springs 42 and 43 disposed in axial parallel relation to the axis of control device 23 and equidistant therefrom adjacent the outer peripheral limits of the device. Spring 42, which may be called an empty-load spring, has the lower end thereof, as viewed in FIG. 2, resting on a spring seat 44 which, in turn, rests on an axially aligned adjusting screw 45 screw-threadedly extending through two adjoining housing sections 46 and 47 of control device 23, the latter section forming atmospheric chamber 41. The opposite or upper end of spring 42 rests against a spring seat 48 which, in turn, rests against the underside of a free end of a fulcrum lever 49 which is pivotally secured or fulcrumed at its opposite or pivoted end by a pin 50 secured in housing section 47. The bottom or lower end of exhaust valve 35, which has an exhaust passageway 51 extending axially therethrough from the upper open end of the exhaust valve to open to atmospheric chamber 41, bears on the upper side of fulcrum lever 49 in a notch 52 between the two ends thereof, said notch being so located as to provide the desired moment arm compatible with the compression rating of spring 42. The respective forces of spring 42 and pressure in chamber 38 acting on diaphragm 29 act in opposing relation to each other on lever 49.

Spring 43, which may be called a loaded-vehicle spring, is arranged with spring seats 53 and 54, a fulcrum lever 55, which is pivotally secured at a pivoted end by a pin 56 in housing section 47, and an adjusting screw 57 in a manner similar to empty-load spring 42 in an opposite disposition with the upper end of stem 26, as viewed in FIG. 2, bearing in a notch 58 formed on the under side of lever 55 directly opposite notch 52 in lever 49. Thus, the force of spring 43 and the resultant force of air spring pressures acting on diaphragms 24 and 25 act in opposing relation to each other on lever 55 and in respective opposite directions to forces of spring 42 and pressure acting on diaphragm 29.

A relatively light spring 59 disposed in chamber 30 serves to bias supply valve 34 toward a seated or closed position on valve seat 36, while a relatively light spring 60 serves to bias exhaust valve 35 into engagement with notch 52 in lever 49.

A positionally adjustable roller member 61 is interposed between fulcrum levers 49 and 55, and is shown in FIG. 2 of the drawing in a normal or central position in alignment with notches 52 and 58 and, therefore, in axial alignment with the respective ends of exhaust valve 35 and stem 26 engaging said notches. Thus, roller 61, along with levers 49 and 51, normally provide a solid-bearing connection in axial alignment with and between diaphragm stem 26 and exhaust valve 35 for transmitting valve actuating force from said stem to said exhaust valve and supply valve 34. Roller 61 may be moved either to the left or right, as viewed in FIG. 2, along levers 49 and 55, by suitable means not shown from outside the housing, for varying the moment arms of said levers and, therefore, the degree of force transmitted through the solid-bearing connection.

In operation of brake pressure control device 23, as long as air spring pressure acting on diaphragms 24 and 25 reflects an empty-load vehicle condition, or less, the resultant force exerted in an upwardly direction by stem 26 and acting on lever 55, is not sufficient for overcoming the opposing force of loaded-vehicle spring 43, therefore, the adjusted compression force of empty-load spring 42 along, acting through lever 49 and exhaust valve 35, effects operation of supply valve 34 to cause delivery of brake pressure via delivery port 33 at a degree commensurate with said compression force of said empty-load spring, which has been pre-set by adjusting screw 45 compatibly with the empty-load requirement of the particular vehicle involved. When the opposing force of pressure acting on the upper side of diaphragm 29 equals the upwardly acting force exerted by spring 42 through lever 49, supply valve 34 and exahust valve 35 assume a lapped state, as above explained.

It should be evident that even if air spring pressure acting on diaphragms 24 and 25 fails so that no upward force is exerted by stem 26, empty-load spring 42 is still effective for providing a minimum brake pressure commensurate with an empty vehicle condition.

If air spring pressure acting on diaphragms 24 and 25 reflects a loaded vehicle condition, the upward force exerted thereby and acting through roller 61 and levers 49 and 55, in this case, is sufficient for overcoming the opposing downwardly directed force of loaded-vehicle spring 43 and thereby cause actuation of valves 35 and 34, as above explained, to effect delivery of brake pressure at a degree commensurate with the vehicle load. Again, it should be realized that the compression of loaded-vehicle spring 43 is pre-adjusted by adjusting screw 57 compatibly with the type of vehicle on which the device is used.

As hereinbefore indicated, the degree of brake pressure delivered via delivery port 33 in an empty-load situation is determined solely by the pre-set compression of empty-load spring 42 notwithstanding the position of roller 61, because no upward force from stem 26 is transmitted through lever 55 and roller 61 in said empty-load situation. On the other hand, in a loaded-vehicle situation, the degree of brake pressure delivered via delivery port 33 for any given air spring pressure acting on diaphragms 24 and 25 is determined by the force of said air spring pressure, the adjusted compression of loaded-vehicle spring 43, and the moment arm of lever 55 as provided by the position of roller 61 relative thereto. This relationship of air spring pressure to brake pressure is represented by line 62 in the graph shown in FIG. 3.

The relationship of brake pressure delivered to air spring pressure can be modified, if necessary, by adjusting compression of the loaded-vehicle spring 43 and/or the adjustment of the position of roller 61 relative to lever 55. Thus, assuming air spring pressure, indicated A in the graph in FIG. 3, remains unchanged under a loaded-vehicle situation, if roller 61 is moved to the left, as viewed in FIG. 2, the effect of the upward force of air spring pressure acting through stem 26 on lever 55 is amplified and, therefore, requires a greater build-up of pressure in equalizing chamber 38 and acting on diaphragm 29 to counterbalance said upward force which results in a higher delivered or brake pressure for same air spring pressure. This relationship is indicated by broken line 63 in the graph. Obviously, movement of roller 61 to the right has an opposite effect to that immediately above described, and is indicated by a broken line 64 in the graph.

It should be understood, as it is to those skilled in the art, that control device 23 responds automatically to load variations of the vehicle for providing delivered brake pressure in accordance therewith.

In the load responsive brake pressure control device 23, as shown in FIG. 2 and immediately above described, the two diaphragms 24 and 25 are provided for the purpose of averaging the air spring pressure. If such averaging of air spring pressure is not deemed necessary, a single diaphragm may be used.

Figure 4:
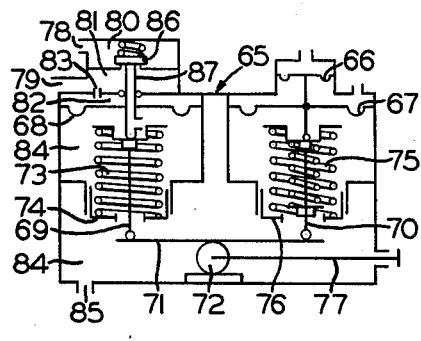
FIG. 4 is a diagrammatic elevational view of a modified form of a brake pressure control device embodying the invention.

Moreover, the several diaphragms 24, 25, and 29 in the control device 23 are arranged in series. A load responsive brake pressure control device 65, however, as shown in FIG. 4, has a pair of air spring pressure diaphragms 66 and 67, corresponding to diaphragms 24 and 25 in device 23, arranged in parallel relation to a force-balancing diaphragm 68. The pair of air spring pressure diaphragms 66 and 67 and the force-balancing diaphragm 68 are provided with respective stems 69 and 70 extending axially therefrom with the free ends thereof resting on opposite ends of a fulcrum lever 71, which, in turn, bears on a positionally adjustable (relative to said fulcrum lever) roller member 72. Also included are an empty-load spring 73 compressibly adjustable by an adjustable spring seat 74, and a loaded-vehicle spring 75 compressibly adjustable by an adjustable spring seat 76. The position of roller member 72 is adjustable by a hand rod 77 connected thereto and accessible on the exterior of the device.

Brake pressure control device 65 is also provided with a pressure supply port 78, a pressure delivery port 79, a fluid pressure supply chamber 80, a fluid pressure delivery chamber 81 communicating with an equalizing chamber 82 via a choke 83, an atmospheric chamber 84 opening to atmosphere past loose fitting spring seat 74 and an atmospheric vent port 85. Control device 65 also includes a supply valve 86 and an exhaust valve 87.

Basically, except for the axial movement of diaphragms 66 and 67 and diaphragms 68 being in a parallel relation, rather than in series, through stems 69 and 70 and lever 71, operation of brake pressure control device 65 is similar to that of brake pressure control device 23, and therefore further details of such operation are not deemed essential to an understanding of the invention.

Having now described my invention, what I claim as new and desire to secure by Letters Patent, is:

1. A vehicle load responsive brake pressure control device for controlling actuating fluid pressure delivered to braking apparatus of a vehicle equipped with air springs, said control device comprising:

a. first diaphragm means subjectable to prevailing air spring fluid pressure for exerting a first diaphragm force in one direction commensurate with the air spring pressure;

b. self-lapping valve means actuable by said first diaphragm force for effecting delivery of actuating braking pressure to the braking apparatus at a pressure according to the air spring pressure;

c. second diaphragm means operably connected to said valve means and subjectable to said actuating braking pressure for exerting a second diaphragm force on said valve means in opposition to said first diaphragm force for operating the valve means to a lapped condition upon balancing of the two opposing forces;

d. a pair of opposingly disposed and compressibly adjustable springs, one of said springs providing a first spring force acting in opposition to said first diaphragm force and the other spring providing a second spring force acting in opposition to said second diaphragm force;

e. fulcrum lever means through which said first and second spring forces are transmitted to said first and second diaphragm means for opposing said first and second diaphragm forces; and f. means for varying the moment arm of said fulcrum lever means for effecting a certain ratio between said first and second diaphragm forces and consequently a corresponding ratio of said braking pressure to said air spring pressure.

2. A vehicle load responsive brake pressure control device, as set forth in claim 1, wherein said first and second diaphragm means are disposed in an axially aligned relation.

3. A vehicle load responsive brake pressure control device, as set forth in claim 2, wherein said fulcrum lever means comprises a pair of fulcrum levers, each having one end pivotally anchored with the opposite ends bearing against said pair of springs, respectively, and said first and second diaphragm means bearing against said fulcrum levers, respectively, at points between the two ends of the respective levers.

4. A vehicle load responsive brake pressure control device, as set forth in claim 3, wherein said means for varying the moment arms of said pair of fulcrum levers comprises a common roller member interposed between and on which both fulcrum levers make bearing pivotal contact, said roller member being positionally adjustable relative to the axes of the fulcrum levers.

5. A vehicle load responsive brake pressure control device, as set forth in claim 1, wherein said first and second diaphragm means are disposed in an axially parallel relation.

6. A vehicle load responsive brake pressure control device, as set forth in claim 5, wherein said fulcrum lever means comprises a single fulcrum lever pivotally supported at a pivot point between its two ends, said two ends having said first and second diaphragm means bearing thereon, respectively.

7. A vehicle load responsive brake pressure control device, as set forth in claim 6, wherein said means for varying the moment arm of said single fulcum lever comprises a roller member on which said single fulcrum lever pivotally rests, said roller member being positionally adjustable relative to the axis of the single fulcrum lever.

8. A vehicle load responsive brake pressure control device, as set forth in claim 1, wherein the compression of said other spring of said pair of springs may be adjusted such that said second spring force acting in opposition to said second diaphragm force is sufficient for effecting a minimum braking pressure commensurate with, at least, an empty vehicle condition, notwithstanding the level of air spring pressure.

* * * * *